US012769348B2

(12) United States Patent
Sekita

(10) Patent No.: US 12,769,348 B2
(45) Date of Patent: Oct. 20, 2026

(54) REGULATOR AND CIRCUIT DEVICE

(71) Applicant: SEIKO EPSON CORPORATION, Tokyo (JP)

(72) Inventor: Shinichi Sekita, Suwa (JP)

(73) Assignee: SEIKO EPSON CORPORATION (JP)

( * ) Notice: Subject to any disclaimer, the term of this patent is extended or adjusted under 35 U.S.C. 154(b) by 217 days.

(21) Appl. No.: 18/743,811

(22) Filed: Jun. 14, 2024

(65) Prior Publication Data

US 2024/0419202 A1 Dec. 19, 2024

(30) Foreign Application Priority Data

Jun. 15, 2023 (JP) ................................ 2023-098445

(51) Int. Cl.

*G05F 1/575* (2006.01)
*G05F 1/46* (2006.01)
*G05F 1/565* (2006.01)

(52) U.S. Cl.

CPC .............. *G05F 1/575* (2013.01); *G05F 1/468* (2013.01); *G05F 1/565* (2013.01)

(58) Field of Classification Search

CPC ........... G05F 1/468; G05F 1/565; G05F 1/575
USPC .......................................................... 323/280
See application file for complete search history.

(56) References Cited

U.S. PATENT DOCUMENTS 10,128,865 B1 * 11/2018 Yang ..................... H03M 1/682
2004/0174150 A1 * 9/2004 Zhang .................... G11C 5/147 323/274
2005/0127987 A1 * 6/2005 Sato .......................... G05F 3/30 327/539
2010/0013442 A1 * 1/2010 Yamazaki ............ H01M 10/44 320/162
2012/0181995 A1 * 7/2012 Chu ....................... G11C 5/147 323/271
2015/0198635 A1 * 7/2015 Shao ................. G01R 19/0084 324/120
2017/0237277 A1 8/2017 Onishi
(Continued)

FOREIGN PATENT DOCUMENTS

JP 2004-273103 A 9/2004
JP 2017-143704 A 8/2017

*Primary Examiner* — Yemane Mehari
(74) *Attorney, Agent, or Firm* — Harness, Dickey & Pierce, P.L.C.

(57) ABSTRACT

A regulator includes a voltage divider circuit that output, as a feedback voltage, a voltage generated by dividing an output voltage; an operational amplifier that compares the feedback voltage with a reference voltage; a drive transistor being disposed between a node at an input voltage and a node at the output voltage and that is controlled based on an output of the operational amplifier; a logic circuit that output an adjustment signal for the output voltage; and an output voltage adjustment circuit configured to adjust the output voltage based on the adjustment signal. The voltage divider circuit includes a plurality of resistors and a plurality of switches each of which is disposed in parallel with a corresponding one of the plurality of resistors. The output voltage adjustment circuit output, to the plurality of switches, a control signal in accordance with the adjustment signal, and the output voltage is supplied as a power supply voltage to the output voltage adjustment circuit.

19 Claims, 9 Drawing Sheets

(56) References Cited

U.S. PATENT DOCUMENTS

| | | | | |
|---|---|---|---|---|
| 2018/0026541 | A1* | 1/2018 | Hashimoto | H02M 3/158 323/271 |
| 2019/0243402 | A1* | 8/2019 | Du | H03F 3/45991 |
| 2024/0393816 | A1* | 11/2024 | Syu | G05F 1/468 |

* cited by examiner

REGULATOR AND CIRCUIT DEVICE

The present application is based on, and claims priority from JP Application Serial Number 2023-098445, filed Jun. 15, 2023, the disclosure of which is hereby incorporated by reference herein in its entirety.

BACKGROUND

1. Technical Field

The present disclosure relates to a regulator, a circuit device, and so on.

2. Related Art

JP-A-2017-143704 describes a control device that controls power supply in supplying discharge power from a battery to a power supply target. In addition, FIG. 6 and other figures and descriptions in JP-A-2017-143704 disclose a regulator for regulating an input voltage to output an output voltage.

It is found that, with such a regulator, an output voltage may be unstable, for example, at the initial setting time, at the start of operation, during operation, and the like of the regulator.

SUMMARY

An aspect of the present disclosure relates to a regulator for regulating an input voltage to output an output voltage, the regulator including a voltage divider circuit configured to output, as a feedback voltage, a voltage generated by dividing the output voltage; an operational amplifier configured to compare the feedback voltage with a reference voltage; a drive transistor being disposed between a node at the input voltage and a node at the output voltage and configured to be controlled based on an output of the operational amplifier; a logic circuit configured to output an adjustment signal for the output voltage; and an output voltage adjustment circuit configured to adjust the output voltage based on the adjustment signal. The voltage divider circuit includes a plurality of resistors, and a plurality of switches, each switch of the plurality of switches being disposed in parallel with a corresponding resistor of the plurality of resistors. The output voltage adjustment circuit is configured to output, to the plurality of switches, a control signal in accordance with the adjustment signal, and the output voltage is supplied as a power supply voltage to the output voltage adjustment circuit.

In addition, another aspect of the present disclosure relates to a circuit device including the regulator described above; a charging circuit configured to, based on the input voltage, charge an object to be charged; and a charge control circuit configured to control the charging circuit. The output voltage is supplied as a power supply voltage for the charge control circuit or a power supply voltage for a detection circuit used for the charge control circuit.

DESCRIPTION OF EMBODIMENTS

Desirable embodiments according to the present disclosure will be described in detail below. The present embodiment described below does not unreasonably limit the content of the present disclosure described in the appended claims, and all of the configurations described in the present embodiment are not necessarily essential as means for solving the present disclosure.

1. Regulator

Figure 1:
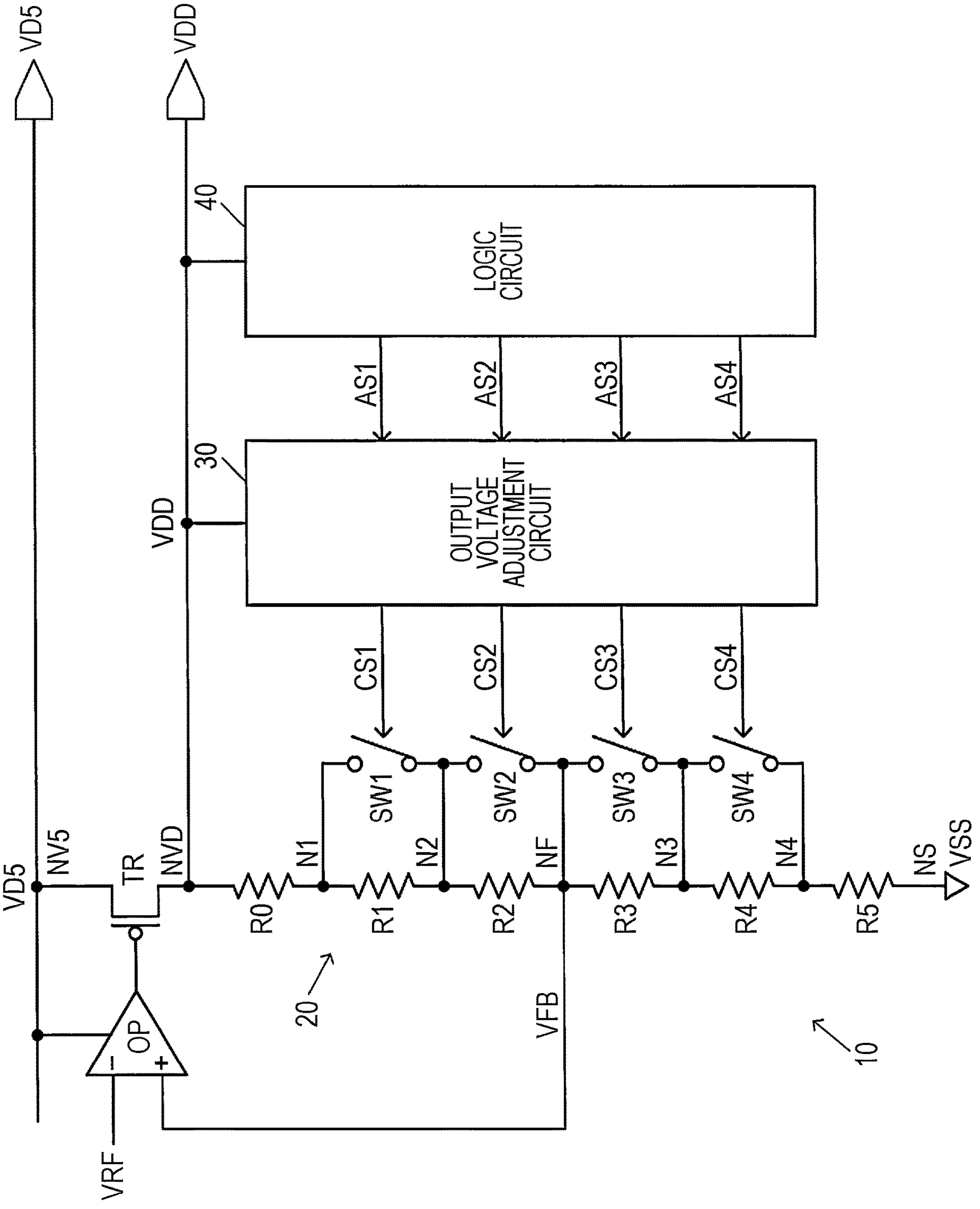
FIG. 1 illustrates an exemplary configuration of a regulator according to the present embodiment.

FIG. 1 illustrates an exemplary configuration of a regulator 10 in the present embodiment. The regulator 10 is a circuit for regulating an input voltage VD5 to output an output voltage VDD. For example, the regulator 10 generates the output voltage VDD, which is a regulated voltage obtained by stepping down the input voltage VD5, based on a reference voltage VRF and outputs the output voltage VDD. In such a way, the output voltage VDD that is a constant voltage obtained by regulating the input voltage VD5 may be generated by using the reference voltage VRF generated by, for example, a reference voltage generating circuit (not illustrated), such as a bandgap reference circuit. The input voltage VD5 is, for example, a first power supply voltage, and the output voltage VDD is, for example, a second power supply voltage. By way of example, the input voltage VD5 is about 5.0 to 3.5 V, and the output voltage VDD is, for example, about 1.8 V. The regulator 10 includes a voltage divider circuit 20, an operational amplifier OP, a drive transistor TR, an output voltage adjustment circuit 30, and a logic circuit 40. The regulator 10 is not limited to the configurations in FIG. 1 and in FIG. 2, FIG. 7, and other figures referred to later and may be implemented as various modifications, such as omitting some of the components in the configuration, adding other components, and replacing some of the components with other components.

The voltage divider circuit 20 outputs, as a feedback voltage VFB, a voltage generated by dividing the output voltage VDD. For example, the voltage divider circuit 20, which is a circuit for dividing a voltage, outputs, as the feedback voltage VFB, a voltage generated by dividing the output voltage VDD using resistors. The feedback voltage VFB is a divided voltage of the output voltage VDD generated by the voltage divider circuit 20.

The operational amplifier OP compares the feedback voltage VFB from the voltage divider circuit 20 with the reference voltage VRF. For example, the operational amplifier OP includes a first input terminal and a second input terminal. The first input terminal is, for example, an inverting input terminal, and the second input terminal is, for example, a non-inverting input terminal. In the operational amplifier OP, the reference voltage VRF is input to the first input terminal and the feedback voltage VFB is input to the second input terminal. Then, the operational amplifier OP outputs a signal based on a difference between the feedback voltage VFB and the reference voltage VRF. The operational amplifier OP is, for example, a differential amplifier including a differential portion to which the reference voltage VRF and the feedback voltage VFB are differentially input, and an output portion to which an output of the differential portion is input, and, for example, operates using the input voltage VD5 as a power supply voltage.

The drive transistor TR is disposed between a node NV5 at the input voltage VD5 and a node NVD at the output voltage VDD. In addition, the drive transistor TR is controlled based on an output of the operational amplifier OP. For example, the drive transistor TR is controlled by an output signal of the operational amplifier OP being input to the gate. In FIG. 1, the drive transistor TR is a p-type metal-oxide-semiconductor (MOS) transistor. For example, the drive transistor TR includes a source coupled to the node NV5 at VD5, a gate coupled to the output of the operational amplifier OP, and a drain coupled to the node NVD at VDD. The drive transistor TR is not limited to this and may be an n-type MOS transistor, a bipolar transistor, or the like. For example, when an n-type transistor is used as the drive transistor TR, the reference voltage VRF may be input to the non-inverting input terminal of the operational amplifier OP, and the feedback voltage VFB may be input to the inverting input terminal.

The logic circuit 40 outputs adjustment signals AS1 to AS4 for the output voltage VDD. The adjustment signals AS1 to AS4 are signals for adjusting voltage values of the output voltage VDD and may be called adjustment codes for the output voltage VDD. As illustrated in FIG. 1, the logic circuit 40 outputs the four adjustment signals, AS1 to AS4 corresponding to four bits; however, the present embodiment is not limited to this and there may be, for example, five or more adjustment signals. The logic circuit 40 is a control circuit and may be implemented, by way of example, by an application-specific integrated circuit (ASIC) using automated place and route, such as a gate array.

The output voltage adjustment circuit 30 adjusts the output voltage VDD based on the adjustment signals AS1 to AS4. For example, the output voltage adjustment circuit 30 adjusts the output voltage VDD by controlling the voltage divider circuit 20 based on the adjustment signals AS1 to AS4.

Specifically, as illustrated in FIG. 1, the voltage divider circuit 20 includes a plurality of resistors R0 to R5 and a plurality of switches SW1 to SW4. The switches SW1 to SW4 are provided such that each switch is disposed in parallel with a corresponding one of the plurality of resistors R1 to R4. In addition, as in FIG. 1, in the voltage divider circuit 20, the resistors R0 and R5 without switches disposed in parallel therewith are also provided. The resistors R0 to R5 are disposed in series between the node NVD at VDD and the node NS at VSS to constitute a voltage ladder. A node at VSS is a node at a predetermined voltage, a non-limiting example of which is a node at a voltage of 0 V corresponding to GND. For example, in the voltage divider circuit 20, the resistor R1 and the switch SW1 are disposed in parallel between a node N1 and a node N2, and the resistor R2 and the switch SW2 are disposed in parallel between the node N2 and a node NF. In addition, in the voltage divider circuit 20, the resistor R3 and the switch SW3 are disposed in parallel between the node NF and a node N3, and the resistor R4 and the switch SW4 are disposed in parallel between the node N3 and a node N4. In addition, the resistor R0 without a switch disposed in parallel therewith is disposed between the node NVD and the node N1, and the resistor R5 without a switch disposed in parallel therewith is disposed between the node N4 and the node NS. Although, for the sake of simplicity, FIG. 1 illustrates an example in which the number of resistors is six and the number of switches is four, the number of resistors and the number of switches in the voltage divider circuit 20 are not limited to the numbers illustrated in FIG. 1 and are arbitrary.

In addition, the output voltage adjustment circuit 30 outputs control signals CS1 to CS4 in accordance with the adjustment signals AS1 to AS4 to the plurality of switches SW1 to SW4. The control signals CS1 to CS4 are signals for turning on or off the switches SW1 to SW4. For example, when one of the control signals CS1 to CS4 is at an active level, a switch to which the control signal is input is turned on; whereas when the control signal is at a non-active level, a switch to which the control signal is input is turned off. The active level is, for example, a high level, and the non-active level is, for example, a low level. For example, it is assumed that a resistor R and a switch SW are disposed in parallel between a node NA and a node NB. In this case, if the switch SW is turned on, the node NA and the node NB are short-circuited and the resistor R is bypassed. In contrast, if the switch SW is turned off, the resistance between the node NA and the node NB is set by the resistor R. In actual operation, the on-resistances of transistors composing the switch SW contribute to the resistance between the node NA and the node NB.

For example, the voltage divider circuit 20 outputs the feedback voltage VFB from the node NF, which is a feedback voltage node. For example, the resistance of the voltage divider circuit 20 between the node NF and the node NS is denoted by r1, and the resistance of the voltage divider circuit 20 between the node NVD and the node NF is denoted by r2. The resistance r1 is a total resistance of the resistors R3, R4, and R5 in series, and the resistance r2 is a total resistance of the resistors R0, R1, and R2 in series. In this case, the output voltage VDD of the regulator 10 is expressed by equation (1) as follows:

$$VDD=\{(r1+r2)/r1\}\times VRF \tag{1}$$

The switches SW1 to SW4 are turned on or off based on the control signals CS1 to CS4 from the output voltage adjustment circuit 30, the resistances r1 and r2 in equation (1) are set, and the voltage value of the output voltage VDD is adjusted. This enables the regulator 10 to output the output voltage VDD with high voltage accuracy, for example, even when variations occur in the reference voltage VRF and the resistances of resistors due to semiconductor process variation or the like.

Then, in the present embodiment, as illustrated in FIG. 1, the output voltage VDD is supplied as a power supply voltage to the output voltage adjustment circuit 30. For example, using the output voltage VDD as the power supply voltage, the output voltage adjustment circuit 30 outputs the control signals CS1 to CS4 to the switches SW1 to SW4. For example, the high-level voltages of the control signals CS1 to CS4 are at the voltage level of the output voltage VDD, which is the power supply voltage.

For example, in order to appropriately control the turn-on or turn-off of the switches SW1 to SW4 of the voltage divider circuit 20, it is desirable that the output voltage adjustment circuit 30 be supplied with the input voltage VD5, which is a voltage higher than VDD, as a power supply voltage and output the control signals CS1 to CS4.

However, when the voltage levels of the control signals CS1 to CS4 for adjusting the output voltage VDD change, such changes in the voltage levels cause voltage fluctuations in the feedback voltage VFB of the voltage divider circuit 20. Then, the voltage fluctuations are transmitted via the drive transistor TR and so on to the input voltage VD5, resulting in voltage fluctuations in the input voltage VD5. For example, both the input voltage VD5 and the output voltage VDD fluctuate. In this case, if the output voltage adjustment circuit 30 generates the control signals CS1 to CS4 by using the input voltage VD5, instead of the output voltage VDD, as the power supply voltage, the voltage fluctuations in the input voltage VD5 are transmitted to the control signals CS1 to CS4, leading to a state where the feedback voltage VFB fluctuates again. This leads to a situation in which voltage fluctuations in the input voltage VD5 and the output voltage VDD do not converge. For example, both the input voltage VD5 and the output voltage VDD fluctuate, for example, at different phases, resulting in a state where voltage convergence is achieved in neither VD5 nor VDD, which poses an issue in that the output of the regulator 10 is not stable.

In this regard, in the present embodiment, the output voltage adjustment circuit 30 uses the output voltage VDD, not the input voltage VD5, as a power supply voltage, to output the control signals CS1 to CS4. Accordingly, even if changes in the control signals CS1 to CS4 cause the feedback voltage VFB to fluctuate, resulting in the occurrence of fluctuations in the input voltage VD5, the fluctuations in the input voltage VD5 are inhibited from being transmitted as fluctuations in the power supply voltage to the output voltage adjustment circuit 30. This may effectively reduce the occurrence of a situation in which voltage convergence is achieved in neither the input voltage VD5 nor the output voltage VDD, resulting in a state where the output of the regulator 10 is not stable.

Figure 2:
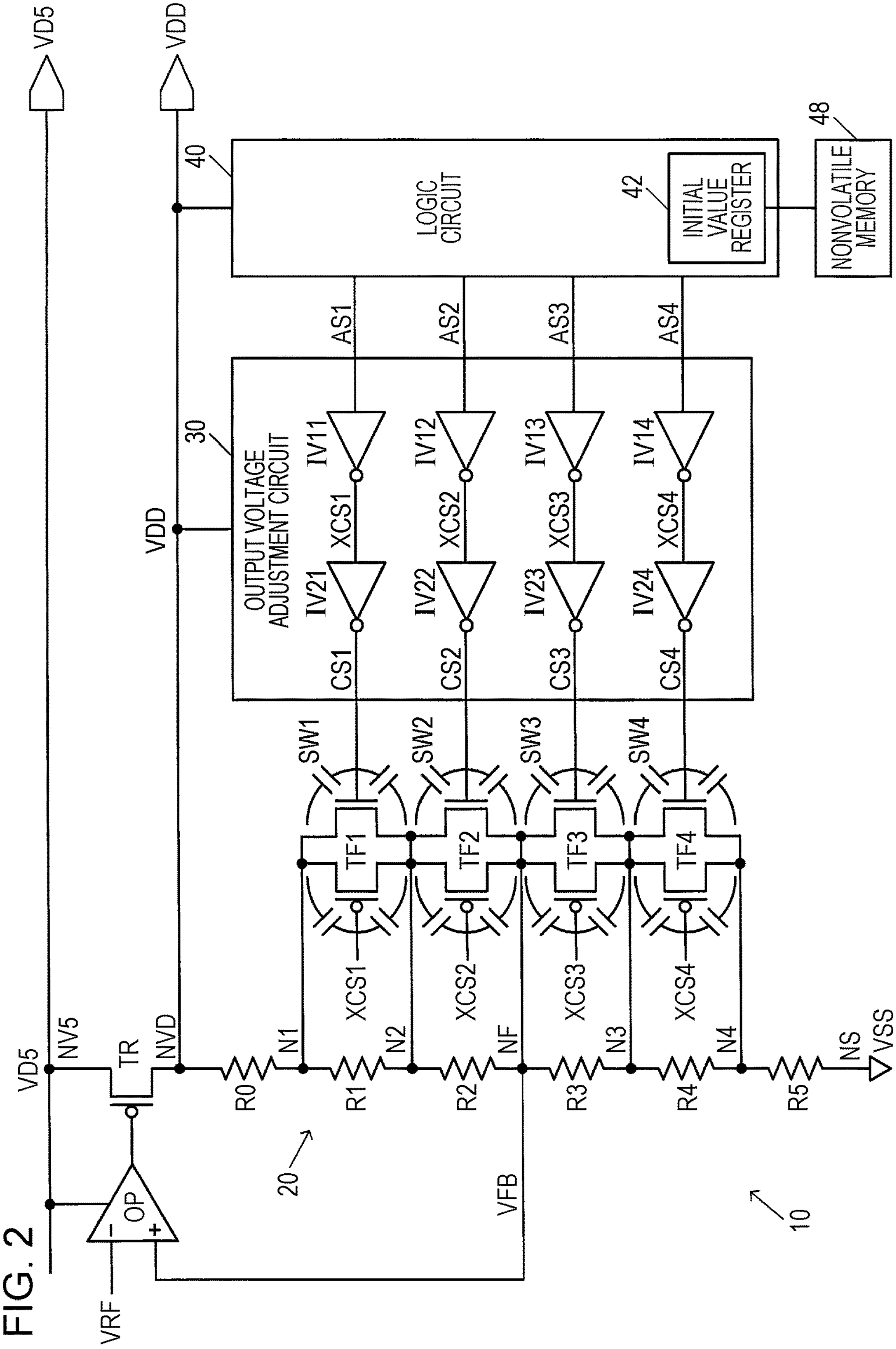
FIG. 2 illustrates a detailed exemplary configuration of the regulator according to the present embodiment.

FIG. 2 illustrates a detailed exemplary configuration of the regulator 10 according to the present embodiment. As illustrated in FIG. 2, each switch of the plurality of switches SW1 to SW4 of the voltage divider circuit 20 includes an n-type transistor and a p-type transistor coupled in parallel. For example, the switches SW1 to SW4 are implemented by transfer gates TF1 to TF4 in each of which an n-type transistor and a p-type transistor are coupled in parallel. In addition, the output voltage adjustment circuit 30 includes inverters IV11 to IV14, which output control signals XCS1 to XCS4, and inverters IV21 to IV24, which receive the outputs of the inverters IV11 to IV14 and output control signals CS1 to CS4. In the inverters IV11 to IV14, for example, the adjustment signals AS1 to AS4 from the logic circuit 40 are input. The inverters IV11 to IV14 are first inverters and the control signals XCS1 to XCS4 are first control signals. As illustrated in FIG. 2, the p-type transistors of the switches SW1 to SW4 (TF1 to TF4) are controlled by XCS1 to XCS4, which are first control signals. However, the n-type transistors may be controlled by the first control signals. In addition, the inverters IV21 to IV24 are second inverters and the control signals CS1 to CS4 are second control signals. As in FIG. 2, the n-type transistors of the switches SW1 to SW4 (TF1 to TF4) are controlled by CS1 to CS4, which are second control signals. However, the p-type transistors may be controlled by the second control signals. Here, the output voltage VDD is supplied as the power supply voltage to the inverters IV11 to IV14 and the inverters IV21 to IV24. In such a manner, the output voltage adjustment circuit 30 includes the first inverters that output the first control signals for controlling one of the n-type transistors and the p-type transistors of the switches SW1 to SW4, and the second inverters that receive the outputs of the first inverters and output the second control signals for controlling the other of the n-type transistor and the p-type transistors of the switches SW1 to SW4.

In such a manner, as in FIG. 2, each of the switches SW1 to SW4 is composed of an n-type transistor and a p-type transistor coupled in parallel, and the output voltage adjustment circuit 30 outputs the control signals XCS1 to XCS4 and CS1 to CS4 for turning on or off these n-type transistors and p-type transistors. Such a configuration may decrease the on-resistance upon turn-on of the switches SW1 to SW4 and enable the switches SW1 to SW4 to be properly turned on by using control signals from the output voltage adjustment circuit 30. For example, in the present embodiment, the output voltage VDD lower than the input voltage VD5 is used as a power supply voltage for the output voltage adjustment circuit 30. Accordingly, if the switches SW1 to SW4 are composed of, for example, only n-type transistors, the on-resistance of a switch close to the node NVD at the output voltage VDD might be very high, or the switches SW1 to SW4 might be unlikely to be turned on properly. In this regard, as in FIG. 2, each of the switches SW1 to SW4 is composed of an n-type transistor and a p-type transistor coupled in parallel. Therefore, for example, even if the n-type transistor is not properly turned on, each of the switches SW1 to SW4 may be turned on properly by turning on the p-type transistor.

In addition, as in FIG. 2, the logic circuit 40 includes an initial value register 42. The initial value register 42 is a register that stores the initial value of an adjustment value for the output voltage VDD, and may be implemented, for example, by a storage circuit such as a flip-flop circuit. In addition, after a power-on reset, the logic circuit 40 outputs the adjustment signals AS1 to AS4 based on the initial value of an adjustment value for the output voltage VDD from the initial value register 42. For example, after a power-on reset is cancelled, the logic circuit 40 generates the adjustment signals AS1 to AS4 based on the initial value of an adjustment value for the output voltage VDD stored in the initial value register 42 and outputs the adjustment signals AS1 to AS4 to the output voltage adjustment circuit 30. The output voltage adjustment circuit 30 outputs the control signals XCS1 to XCS4 and CS1 to CS4 obtained by buffering the adjustment signals AS1 to AS4 based on the initial value of an adjustment value for the output voltage VDD to the voltage divider circuit 20 to control the turn-on or turn-off of the switches SW1 to SW4. In such a manner, since the turn-on or turn-off of the switches SW1 to SW4 is controlled using a control signal based on the initial value of an adjustment value, the resistance ratio in the voltage divider circuit 20 is set to a resistance ratio corresponding to the initial value of an adjustment value, and the output voltage VDD is set to a voltage corresponding to the initial value of an adjustment value. Such a way enables the turn-on or turn-off of the switches SW1 to SW4 to be properly controlled after a power-on reset to set the output voltage VDD to a voltage corresponding to the initial value of an adjustment value.

In addition, as in FIG. 2, the logic circuit 40 outputs the adjustment signals AS1 to AS4 based on an adjustment value for the output voltage VDD read out from a nonvolatile memory 48. That is, the nonvolatile memory 48 is disposed in the circuit device 2 including the regulator 10 described later with reference to FIG. 9 and stores an adjustment value for the output voltage VDD. The nonvolatile memory 48 is, for example, an electrically erasable programmable read-only memory (EEPROM), such as a floating gate avalanche injection MOS (FAMOS) memory or a metal-oxide-nitride-oxide-silicon (MONOS) memory, but is not limited to this and may be a one time programmable (OTP) memory, a fuse-type ROM, or the like. For example, at the manufacturing time or the inspection time of semiconductors of the circuit device 2, the adjustment value for the output voltage VDD is determined by monitoring the output voltage VDD with a measuring instrument such as a tester. That is, an adjustment value for setting the output voltage VDD to a desirably specified voltage is determined, and the determined adjustment value is written to the nonvolatile memory 48 of the circuit device 2. Then, during operating time of the circuit device 2, the logic circuit 40 reads out the adjustment value from the nonvolatile memory 48 and generates the adjustment signals AS1 to AS4 based on the read-out adjustment value. The output voltage adjustment circuit 30 outputs the control signals XCS1 to XCS4 and CS1 to CS4 obtained by buffering the adjustment signals AS1 to AS4 based on the adjustment value for the output voltage VDD to the voltage divider circuit 20 to control the turn-on or turn-off of the switches SW1 to SW4. In such a way, since the turn-on or turn-off of the switches SW1 to SW4 is controlled using a control signal based on the adjustment value stored in the nonvolatile memory 48, the resistance ratio in the voltage divider circuit 20 is set to a resistance ratio corresponding to the adjustment value, and the output voltage VDD is set to a voltage corresponding to the adjustment value. Such a way enables the turn-on or turn-off of the switches SW1 to SW4 to be controlled properly based on an adjustment value stored in the nonvolatile memory 48 to set the output voltage VDD to a voltage corresponding to the adjustment value.

In addition, as in FIG. 2, the output voltage VDD is supplied as a power supply voltage in common to the output voltage adjustment circuit 30 and the logic circuit 40. That is, the output voltage VDD is supplied as a power supply voltage to the output voltage adjustment circuit 30, and the output voltage VDD is also supplied to the logic circuit 40. Such a way enables the adjustment signals AS1 to AS4 to be generated by causing the logic circuit 40 to operate based on the output voltage VDD generated by the regulator 10, so that the adjustment signals AS1 to AS4 are input to the output voltage adjustment circuit 30 that operates using, as the power supply voltage, the same output voltage VDD. In addition, this enables adjustment of the output voltage VDD by controlling the voltage divider circuit 20 using the control signals CS1 to CS4 and the control signals XCS1 to XCS4.

Figure 3:
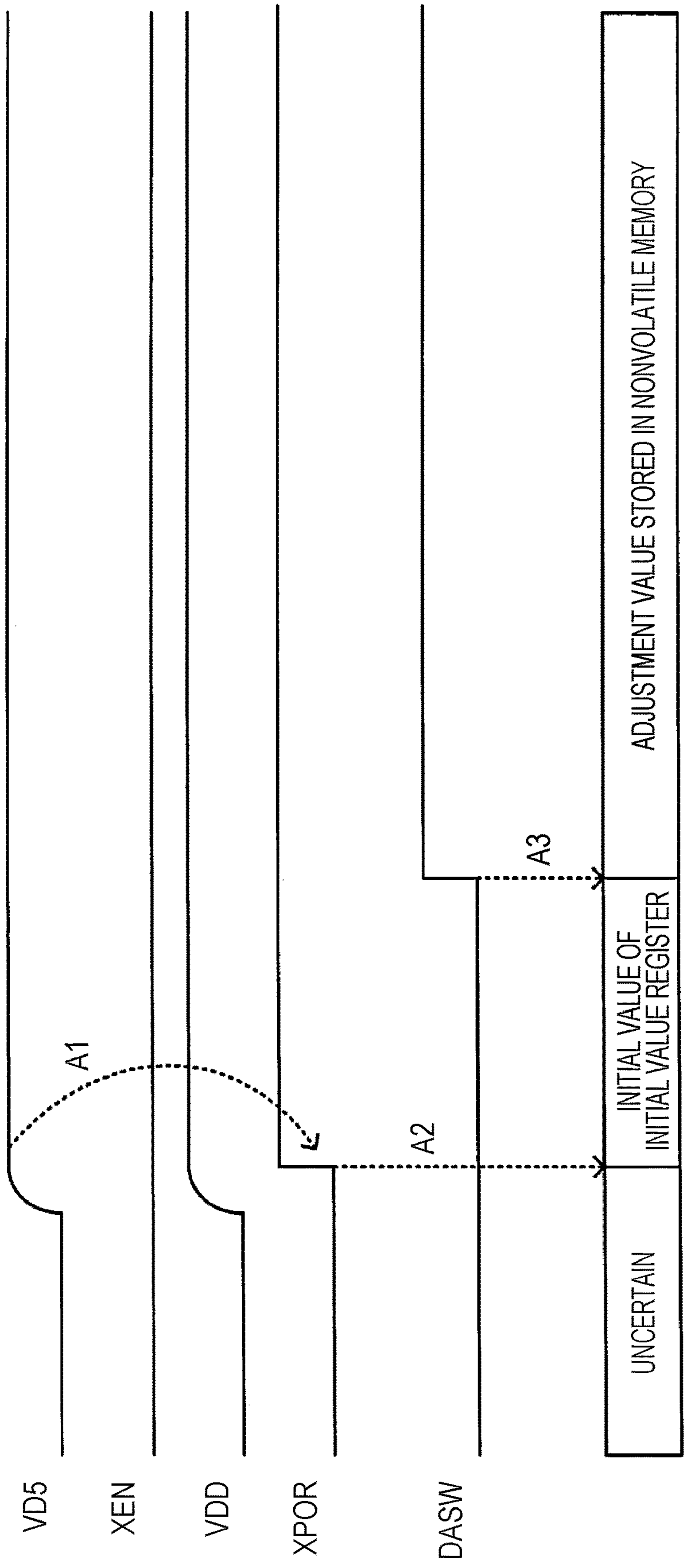
FIG. 3 is a signal waveform diagram illustrating the operation of the regulator.

FIG. 3 is a signal waveform diagram illustrating the operation of the regulator 10 in the present embodiment. When the input voltage VD5 of the regulator 10 rises and the output voltage VDD of the regulator 10 rises, a power-on reset is performed in response to the power-on reset signal XPOR from a power-on reset circuit. For example, a negative logic enable signal XEN, which is a signal for activating the regulator 10, is at a low level, which is the active level. Then, when the negative logic power-on reset signal XPOR goes high, the reset condition of the logic circuit 40 is cleared, and, as indicated by A2 in FIG. 3, the initial value of an adjustment value for the output voltage is read out from the initial value register 42 and the adjustment signals AS1 to AS4 corresponding to the initial value of an adjustment value are output from the logic circuit 40 to the output voltage adjustment circuit 30. Then, the output voltage adjustment circuit 30 outputs a control signal corresponding to the initial value of an adjustment value to the voltage divider circuit 20, and thereby the resistances (resistance ratio) of the voltage divider circuit 20 are set and the output voltage VDD corresponding to the initial value of an adjustment value is output from the regulator 10. The output voltage VDD corresponding to the initial value of an adjustment value is a voltage of, for example, about 1.8 V, which is a typical value.

Thereafter, when a given period of time has elapsed and a data switch signal DASW changes to a high level, which is the active level, an adjustment value for the output voltage VDD stored in the nonvolatile memory 48 is read out. Then, the adjustment signals AS1 to AS4 corresponding to the adjustment value are output from the logic circuit 40 to the output voltage adjustment circuit 30. This adjustment value is a value that is set by monitoring the output voltage VDD at the manufacturing time of the circuit device 2 including the regulator 10. Then, the output voltage adjustment circuit 30 outputs a control signal corresponding to the adjustment value to the voltage divider circuit 20, and thereby the resistances of the voltage divider circuit 20 are set and the output voltage VDD corresponding to the adjustment value is output from the regulator 10. Thereby, the output voltage VDD with reduced effects of variations in semiconductor manufacturing may be output from the regulator 10, which enables the output of the output voltage VDD with high voltage accuracy.

As described above, in the present embodiment, in the regulator 10 that outputs a constant voltage, the output voltage VDD of the regulator 10 is supplied to the power supply of the output voltage adjustment circuit 30 in order to improve unstable behaviors in the regulator output occurring when the output voltage VDD dynamically changes due to loading of data from the initial value register 42 and the nonvolatile memory 48.

Figure 4:
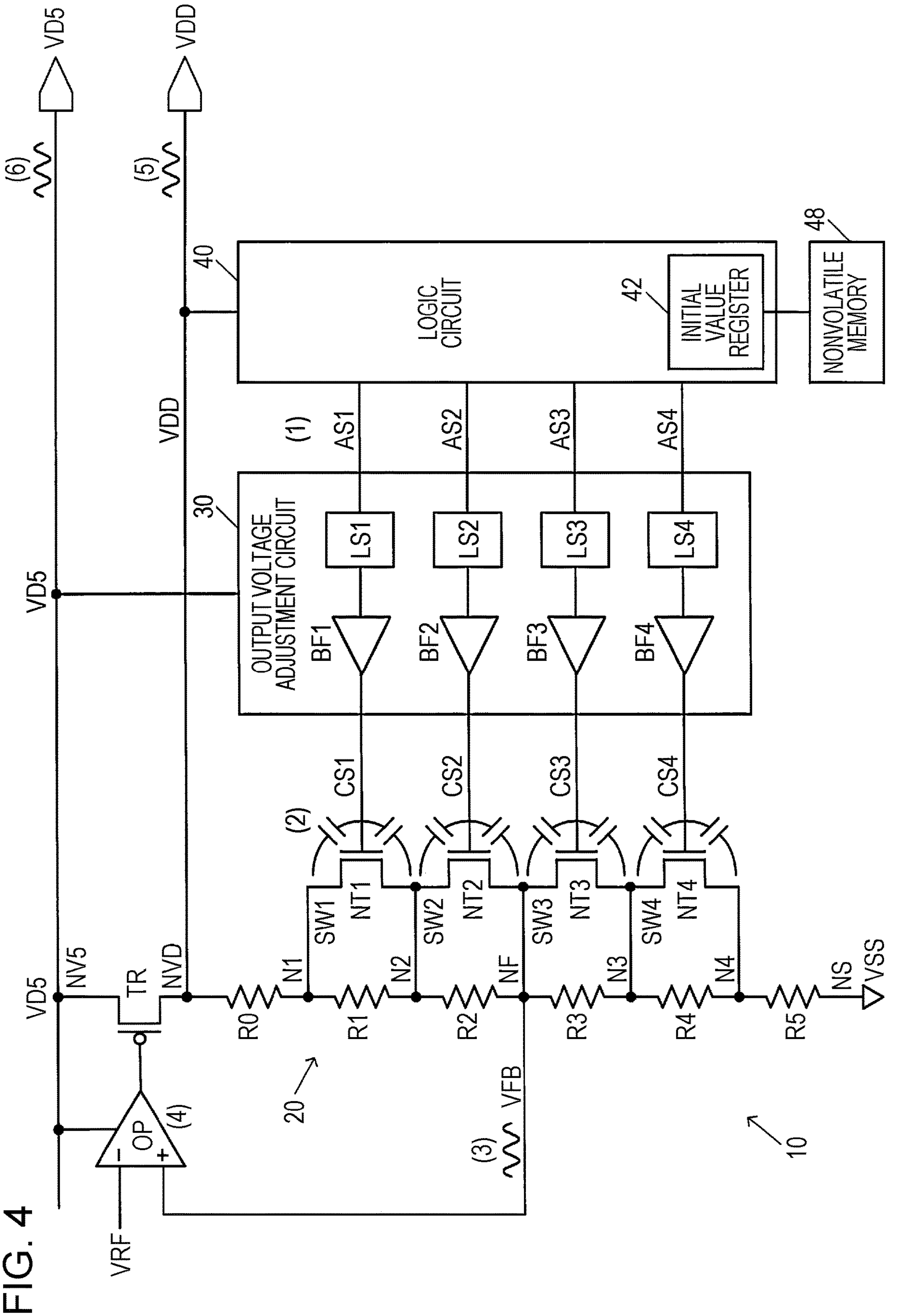
FIG. 4 is a diagram illustrating issues in the comparative example.

For example, FIG. 4 illustrates an exemplary configuration of the regulator 10 of a comparative example of the present embodiment. The input voltage VD5 from 3.5 V to 5.0 V from a high-voltage (HV) regulator (not illustrated) that has a high breakdown voltage, for example, is supplied as the power supply to the regulator 10, and the regulator 10 outputs the output voltage VDD, which is, for example, a constant voltage of 1.8 V. The output voltage VDD is used as a power supply for the logic circuit 40, for a detection circuit 70, and for a charge control circuit 62 in FIG. 9 described later. In addition, in order to improve the voltage accuracy of the output voltage VDD, the regulator 10 includes the output voltage adjustment circuit 30. The output voltage adjustment circuit 30 includes drive circuits BF1 to BF4 that output the control signals CS1 to CS4 for the switches SW1 to SW4 that adjust the feedback resistance ratio of the voltage divider circuit 20. The drive circuits BF1 to BF4 are powered by the input voltage VD5 from the HV regulator, and the switches SW1 to SW4 are composed of only the n-type MOS transistors NT1 to NT4. In addition, in the output voltage adjustment circuit 30, level shifters LS1 to LS4 are provided for shifting the voltage levels of the adjustment signals AS1 to AS4 from the logic circuit 40 powered by VDD of 1.8 V. Furthermore, the nonvolatile memory 48 stores data for adjusting VDD to 1.8 V, and if VD5 has become greater than or equal to a predetermined voltage level, the power-on reset is cancelled and the logic circuit 40 starts to operate. When the logic circuit 40 starts to operate, the initial value of an adjustment value of the output voltage VDD is loaded into the output voltage adjustment circuit 30, and, after a predetermined time period, data on an adjustment value for VDD stored in the nonvolatile memory 48 is loaded. A resistance is selected based on the data on an adjustment value for VDD by the output voltage adjustment circuit 30, so that VDD=1.8 V, which is a desired voltage, is obtained.

In such a manner, in the regulator 10, data on an adjustment value for the output voltage VDD is dynamically switched while the circuits are in operation. In addition, in the voltage divider circuit 20, the switches SW1 to SW4 are disposed in parallel to the feedback resistors R1 to R4, in each of which a parasitic capacitance between the gate and the drain (gate-to-drain parasitic capacitance) and a parasitic capacitance between the gate and the source (gate-to-source parasitic capacitance) exist. In addition, as in FIG. 4, the input voltage VD5 is used as the power supply of the drive circuits BF1 to BF4 for the switches SW1 to SW4.

Then, when, in response to switching of an adjustment value, the adjustment signals AS1 to AS4 from the logic circuit 40 change as illustrated at (1) of FIG. 4, the voltage levels of the control signals CS1 to CS4 based on the adjustment signals AS1 to AS4 change. Then, when the switches SW1 to SW4 controlled by the control signals CS1 to CS4 change from on to off or from off to on, the potential of the gate of an n-type transistor of each switch changes from VD5 to VSS or from VSS to VD5. Then, as illustrated at (2) of FIG. 4, the change in potential of the gate is transmitted via the gate-to-drain parasitic capacitance and the gate-to-source parasitic capacitance to the node NF at the feedback voltage VFB. This results in a state where, as illustrated at (3) of FIG. 4, the feedback voltage VFB fluctuates unintentionally. After such unintended fluctuations in the feedback voltage VFB, the operational amplifier OP later controls the output voltage VDD as illustrated at (4) of FIG. 4 and, as a result, the output voltage VDD of the regulator 10 also fluctuates as illustrated at (5) of FIG. 4, which causes a situation such as output ringing, which is an unstable output state. For example, when VD5 output by the HV regulator is used as the power supply of the regulator 10 for VDD, at the same time as fluctuations occur in the output of VDD, which are loads on VD5, the voltage level of VD5 fluctuates as illustrated at (6) of FIG. 4, such that the output voltages of both of VDD and VD5 fluctuate each other, which causes a situation in which voltage convergence is achieved in neither VD5 nor VDD.

In this regard, in the present embodiment in FIG. 1 and FIG. 2, the inverters IV11 to IV24, which are drive circuits that output control signals to the switches SW1 to SW4, are powered by VDD. Therefore, when the adjustment value for the output voltage VDD dynamically changes, the feedback voltage VFB fluctuates via the gate-to-source parasitic capacitances and the gate-to-drain parasitic capacitances of the switches SW1 to SW4; however, there is no circuit loop in which VD5 and VDD interfere with each other, and therefore the voltage of VDD is likely to converge. In addition, in the present embodiment, each of the plurality of switches SW1 to SW4, which short-circuit feedback resistors, is composed of a pair of a p-type transistor and an n-type transistor. Such a configuration enables desired on-resistance characteristics to be obtained for the switches SW1 to SW4 that short-circuit feedback resistors even when the power supply of the output voltage adjustment circuit 30 changes to VDD lower than VD5. For example, if the switches SW1 to SW4 are composed of, for example, only n-type transistors as in the comparative example in FIG. 4, the on-resistance of a switch close to the node NVD at VDD might be excessively high, or the switches might not be properly turned on. However, when a switch is composed of a pair of a p-type transistor and an n-type transistor, such a state may be inhibited.

Figure 5:
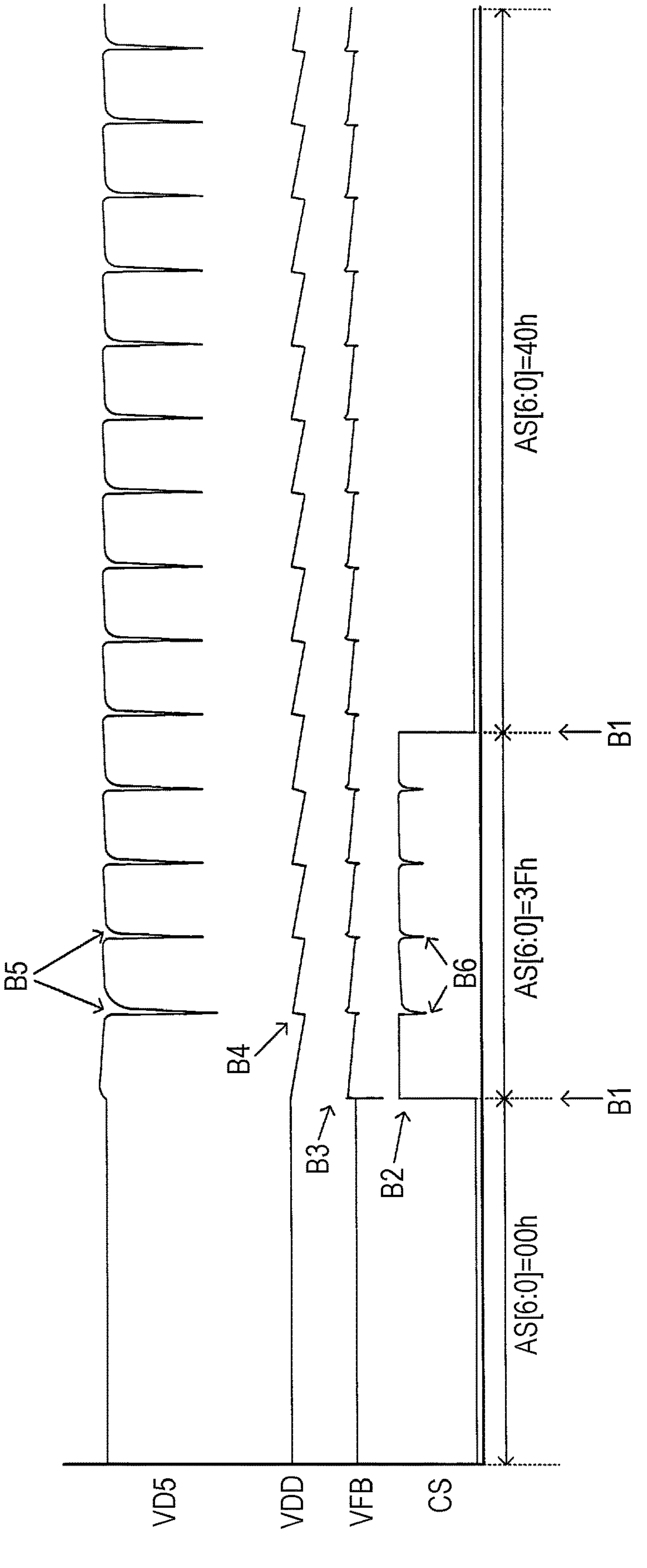
FIG. 5 is a signal waveform diagram at each node in the comparative example.

FIG. 5 is a diagram illustrating signal waveforms at each node in the comparative example in FIG. 4. In FIG. 5, AS [6:0] corresponds to the adjustment signals AS1 to AS7 in FIG. 7 described later, and CS corresponds to control signals CS1 to CS7 and XCS1 to XCS7. In addition, at B1 in FIG. 5, the adjustment signal AS [6:0] changes as the initial value is read out from the initial value register 42 or as the adjustment value is read out from the nonvolatile memory 48. Thereby, as indicated by B2, the voltage level of the control signal CS, which is the gate voltage of the transistors NT1 to NT4 constituting the switches SW1 to SW4, changes. This voltage change is transmitted via the gate-to-source and gate-to-drain parasitic capacitances of the transistors NT1 to NT4, thereby causing fluctuations in the feedback voltage VFB as indicated at B3. To address the fluctuations in the feedback voltage VFB, the operational amplifier OP controls as indicated at B4 so that the output voltage VDD approaches 1.8 V, which is an adjustment voltage. However, the fluctuations in VDD is transmitted via the drive transistor TR to VD5, and fluctuations also occur in VD5 as indicated at B5. Then, the fluctuations in VD5 indicated at B5 are transmitted to the drive circuits BF1 to BF4 of the output voltage adjustment circuit 30 powered by VD5, resulting in the fluctuations in the control signal CS as indicated at B6. The fluctuations in the control signal CS causes the feedback voltage VFB to fluctuate via parasitic capacitances, thereby causing VDD and VD5 to fluctuate to form a circuit loop in which VDD and VD5 interfere with each other. This results in a state where the fluctuations do not converge.

Figure 6:
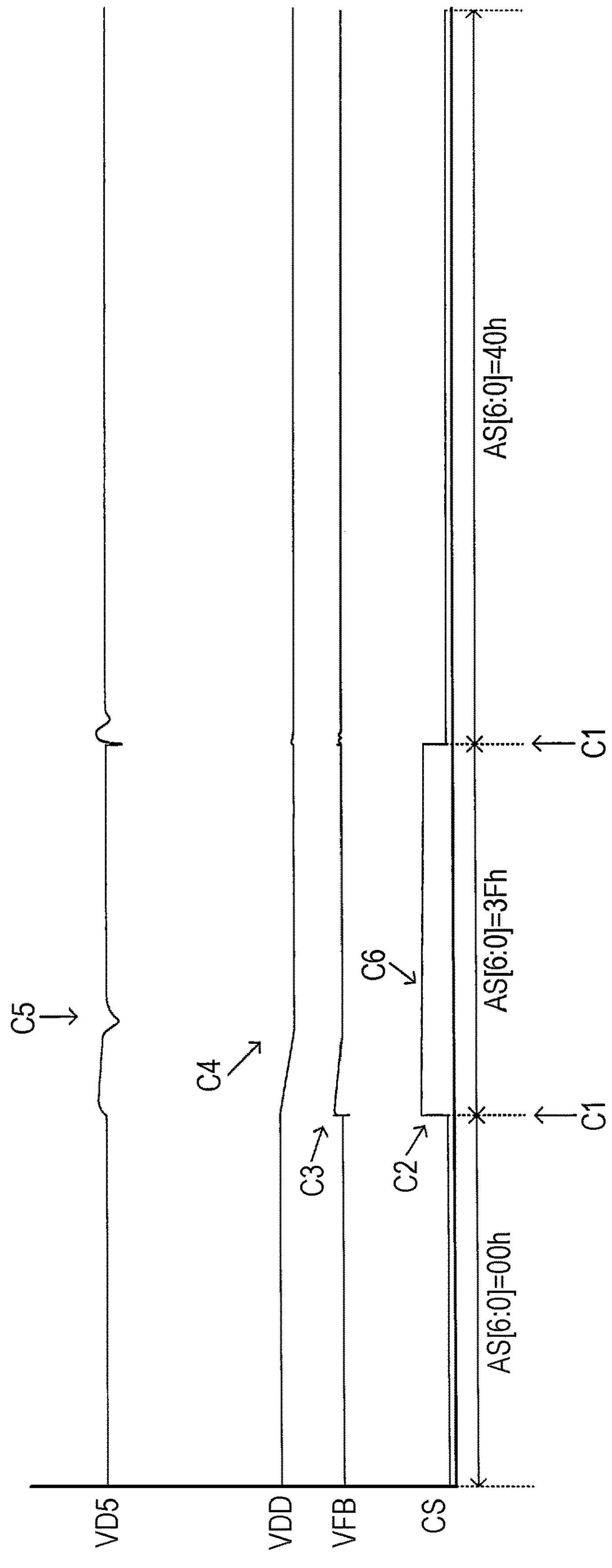
FIG. 6 is a signal waveform diagram at each node in the present embodiment.

FIG. 6 is a diagram illustrating signal waveforms of each node in the present embodiment. At C1 in FIG. 6, the voltage of the control signal CS changes as the initial value is read out from the initial value register 42 or as the adjustment value is read out from the nonvolatile memory 48. This voltage change is transmitted via the parasitic capacitances, thereby causing fluctuations in the feedback voltage VFB as indicated at C3. To address the fluctuations in the feedback voltage VFB, the operational amplifier OP performs control as indicated at C4 so that the output voltage VDD approaches 1.8 V, which is an adjustment voltage. Then, at C5, fluctuations occur in VD5. However, in the present embodiment, as illustrated in FIG. 1 and FIG. 2, in the output voltage adjustment circuit 30, VDD, instead of VD5, is supplied as a power supply and therefore, as illustrated at C6, the fluctuations in the control signal CS caused by the fluctuations in VD5 do not occur. Accordingly, a circuit loop in which the fluctuations in VD5 and the fluctuations in VDD interfere with each other, as in the comparative example in FIG. 4 and FIG. 5 is not formed. This inhibits the state where the fluctuations do not converge.

That is, for the fluctuations in the feedback voltage VFB, feedback control performed by the operational amplifier OP work for VDD so that VDD is a constant voltage; however, such feedback control does not work for VD5. Accordingly, if, as in the comparative example in FIG. 4 and FIG. 5, VD5 for which feedback control performed by the operational amplifier OP does not work is supplied to power the output voltage adjustment circuit 30, the fluctuations in VD5 and the fluctuations in VDD interfere with each other, resulting in the state where the fluctuations do not converge. In contrast, in the present embodiment, VDD for which feedback control performed by the operational amplifier OP works is supplied to power the output voltage adjustment circuit 30, and therefore the state where the fluctuations in VD5 and VDD do not converge may be inhibited as illustrated in FIG. 6.

2. Voltage Divider Circuit

Figure 7:
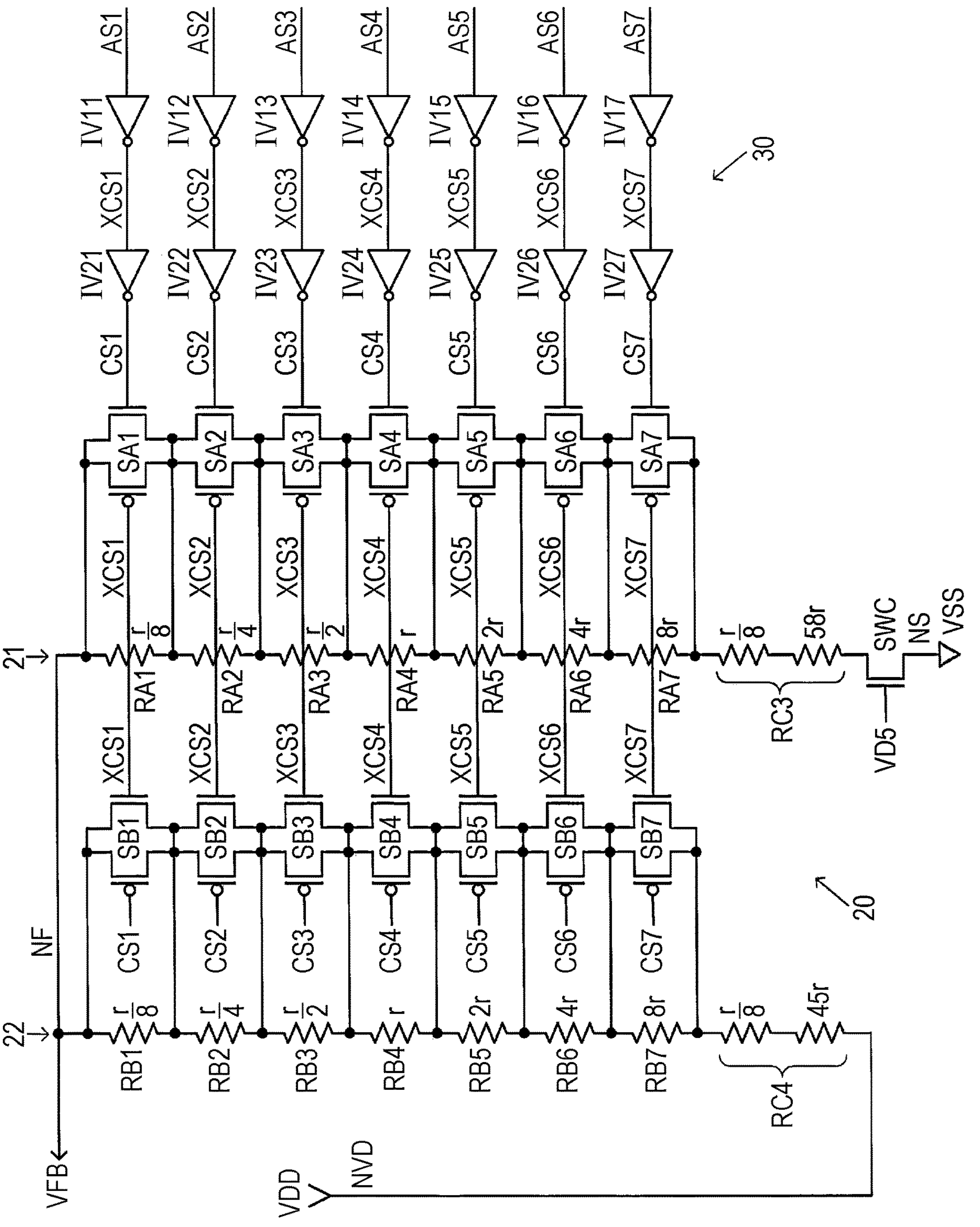
FIG. 7 illustrates a detailed exemplary configuration of a voltage divider circuit.

FIG. 7 illustrates a specific exemplary configuration of the voltage divider circuit 20. The voltage divider circuit 20 is not limited to the configuration illustrated in FIG. 7 and may be implemented as various modifications, such as omitting some of the components in the configuration, adding other components, and replacing some of the components with other components.

As illustrated in FIG. 7, a plurality of resistors of the voltage divider circuit 20 include a first resistor group 21 and a second resistor group 22. The first resistor group 21 is disposed between the node NF, from which the feedback voltage VFB is output, and the node NS at VSS, which is a predetermined voltage node. In addition, the second resistor group 22 is disposed between the node NVD at the output voltage VDD and the node NF at the feedback voltage VFB. In such a manner, the output voltage VDD may be set to a voltage in accordance with an adjustment value by controlling the turn-on or turn-off of each switch disposed in parallel with a corresponding resistor of the first resistor group 21 and each switch disposed in parallel with a corresponding resistor of the second resistor group 22. In the present embodiment, the first resistor group 21 and the second resistor group 22 may be collectively referred to as feedback resistors.

For example, the first resistor group 21 includes a plurality of resistors RA1 to RA7, which are disposed in series between the node NF at the feedback voltage VFB and the node NS at VSS. In addition, switches SA1, SA2, SA3, SA4, SA5, SA6, and SA7 are disposed in parallel with resistors RA1, RA2, RA3, RA4, RA5, RA6, RA7, respectively. Furthermore, the resistances of the resistors RA1, RA2, RA3, RA4, RA5, RA6, and RA7 are weighted in binary, such as r/8, r/4, r/2, r, 2r, 4r, and 8r, respectively. In such a manner, the resistances of the first resistor group 21 may be set to resistance values in accordance with an adjustment value of binary data by controlling the turn-on or turn-off of the switches SA1 to SA7 in accordance with the adjustment signals AS1 to AS7. The resistance r is, by way of example, about 10 kΩ.

The second resistor group 22 also includes a plurality of resistors RB1 to RB7, which are disposed in series between the node NVD at the output voltage VDD and the node NF at the feedback voltage VFB. In addition, switches SB1, SB2, SB3, SB4, SB5, SB6, and SB7 are disposed in parallel with resistors RB1, RB2, RB3, RB4, RB5, RB6, RB7, respectively. Furthermore, the resistances of the resistors RB1, RB2, RB3, RB4, RB5, RB6, and RB7 are weighted in binary, such as r/8, r/4, r/2, r, 2r, 4r, and 8r, respectively. In such a manner, the resistances of the second resistor group 22 may be set to resistances in accordance with an adjustment value of binary data by controlling the turn-on or turn-off of the switches SB1 to SB7 in accordance with the adjustment signals AS1 to AS7.

With reference to FIG. 7, the logic circuit 40 outputs the adjustment signal AS1 such that when the switch SA1 disposed in parallel with the resistor RA1 of the first resistor group 21 is in one of the on state and the off state, the switch SB1 disposed in parallel with the resistor RB1 of the second resistor group 22 is in the other of the on state and the off state. That is, the switch SA1 for the resistor of the first resistor group 21 and the switch SB1 for the resistor of the second resistor group 22 are exclusively turned on or off. For example, the control signal CS1 that is positive logic is input to the n-type transistor of the switch SA1 and the p-type transistor of the switch SB1 and the control signal XCS1 that is negative logic is input to the p-type transistor of the switch SA1 and the n-type transistor of the switch SB1, which enables such exclusive control.

The logic circuit 40 also outputs the adjustment signal AS2 such that when the switch SA2 disposed in parallel with the resistor RA2 of the first resistor group 21 is in one of the on state and the off state, the switch SB2 disposed in parallel with the resistor RB2 of the second resistor group 22 is in the other of the on state and the off state. That is, the switch SA2 and the switch SB2 are exclusively turned on or off. For example, the n-type transistor of the switch SA2 and the p-type transistor of the switch SB2 receive the control signal CS2 that is positive logic, and the p-type transistor of the switch SA2 and the n-type transistor of the switch SB2 receive the control signal XCS2 that is negative logic, which enables such exclusive control.

The switches SA3 to SA7 disposed in parallel with the resistors RA3 to RA7 of the first resistor group 21 and the switches SB3 to SB7 disposed in parallel with the resistors RB3 to RB7 of the second resistor group 22 are also exclusively controlled to be turned on or off by the adjustment signals AS3 to AS7. Here, the resistors RA1 to RA7 of the first resistor group 21 are first resistors, and the switch SA1 to SA7 are first switches. In addition, the resistors RB1 to RB7 of the second resistor group 22 are second resistors, and the switch SB1 to SB7 are second switches.

In such a manner, as in FIG. 7, the logic circuit 40 outputs the adjustment signals AS1 to AS7 such that when the first switch disposed in parallel with the first resistor of the first resistor group 21 is in one of the on state and the off state, the second switch disposed in parallel with the second resistor of the second resistor group 22 is in the other of the on state and the off state. Such a way enables implementation of switch control so as not to change the total resistance of feedback resistors composed of the first resistor group 21 and the second resistor group 22. That is, in the present embodiment, switches that are short-circuited when turned on and switches that are opened when turned off are disposed in pairs for the first resistor group 21 and the second resistor group 22, thereby inhibiting the total resistance of feedback resistors from changing. This enables the variations in current consumption to be decreased with consideration for the application on the circuit device 2 including the regulator 10.

For example, in the present embodiment, the first resistors of the first resistor group 21 and the second resistors of the second resistor group 22 are registers having the same resistances. For example, the resistor RA1 of the first resistor group 21 and the corresponding resistor RB1 of the second resistor group 22 are set to the same resistance, r/8. In addition, the resistor RA2 of the first resistor group 21 and the corresponding resistor RB2 of the second resistor group 22 are set to the same resistance, r/4. In addition, the resistor RA3 of the first resistor group 21 and the corresponding resistor RB3 of the second resistor group 22 are set to the same resistance, r/2. Similarly, the resistors RA4 to RA7 of the first resistor group 21 and the resistors RB4 to RB7 of the second resistor group 22 are set to the same resistances. In such a way, when, for example, the first switch of the first resistor group 21 is turned on and the resistance of the first resistor group 21 decreases, the second switch of the second resistor group 22 is turned off and the resistance of the second resistor group 22 increases by a value corresponding to the decrease in the resistance, which results in no change in the total resistance. In addition, when the first switch of the first resistor group 21 is turned off and the resistance of the first resistor group 21 increases, the second switch of the second resistor group 22 is turned on and the resistance of the second resistor group 22 decreases by a value corresponding to the increase in the resistance, which results in no change in the total resistance.

In addition, as in FIG. 7, the voltage divider circuit 20 includes a resistor RC3 disposed in series to the first resistor group 21 and a resistor RC4 disposed in series to the second resistor group 22. The resistor RC3 is a third resistor, and the resistor RC4 is a fourth resistor. For example, the resistor RC3 is disposed in series to the first resistor group 21 between the node NF and the node NS. The resistor RC4 is disposed in series to the second resistor group 22 between the node NVD and the node NF. In addition, the resistances of the resistors RC3 and RC4 are set such that when all of the plurality of switches of the voltage divider circuit 20 are on or off, the output voltage VDD is a given set voltage. For example, as in FIG. 7, the resistance of the resistor RC3 is set to r/8+58r, and the resistance of the resistor RC4 is set to r/8+45r.

Figure 8:
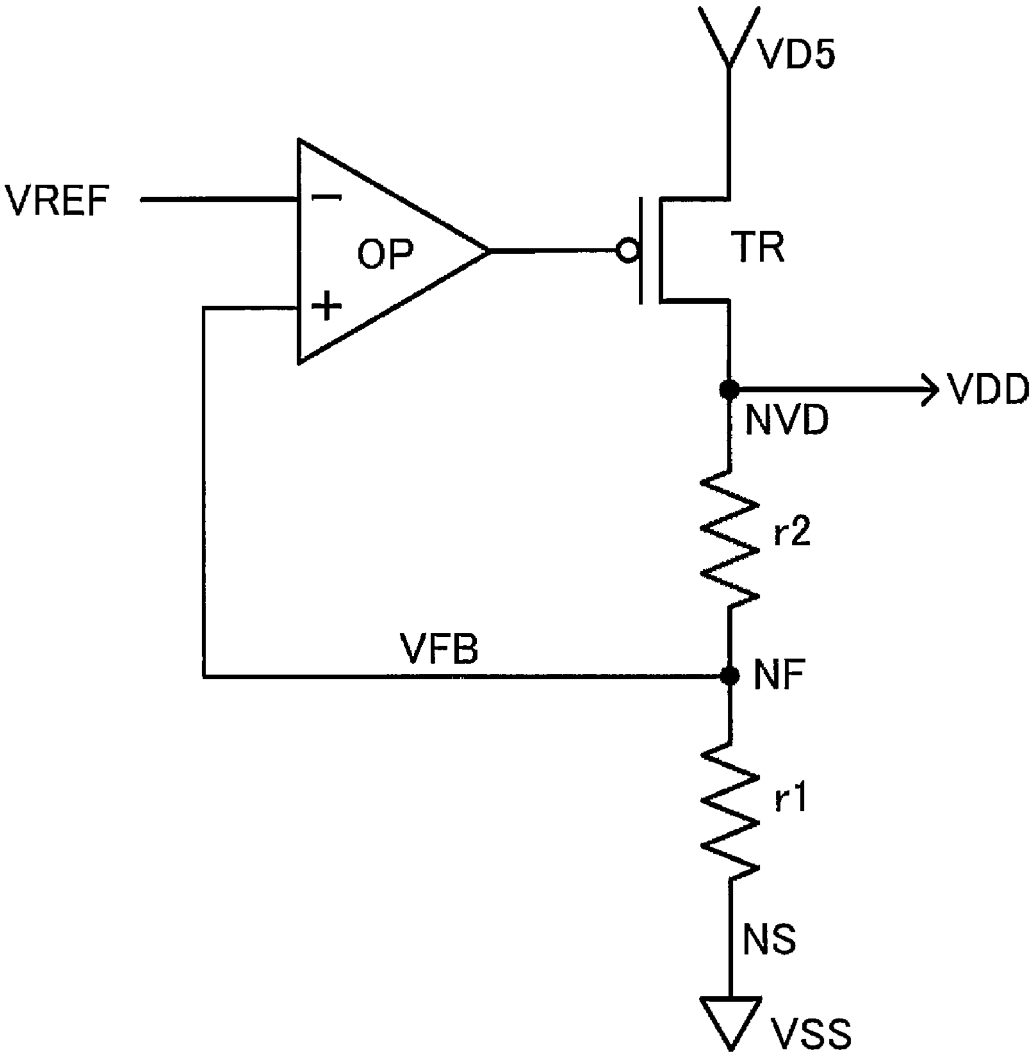
FIG. 8 illustrates a method of setting an output voltage to a given set voltage.

By way of example, as illustrated in FIG. 8, the resistances of the resistors RC3 and RC4 are set such that when all of the plurality of switches of the voltage divider circuit 20 are off, the resistance r1 between the node NF and the node NS and the resistance r2 between the node NVD and the node NF are about 731 kΩ and about 602 kΩ, respectively. Thereby, the output voltage VDD of the regulator 10 is, for example, about 1.82 V. In addition, the resistances of the resistors RC3 and RC4 are set such that when all of the plurality of switches of the voltage divider circuit 20 are on, the resistance r1 and the resistance r2 as in FIG. 8 are about 574 kΩ and about 445 kΩ, respectively. Thereby, the output voltage VDD of the regulator 10 is, for example, about 1.77 V.

For example, at times, such as after power-up, the output of the logic circuit 40, for example, is in an unstable state, and therefore all of the switches of the voltage divider circuit 20 may be on or may be off. In this case, without the resistors RC3 and RC4 without switches disposed in parallel therewith as illustrated in FIG. 7, the output voltage VDD of the regulator 10 may become a voltage far from the target voltage, such as 1.8 V. Thereafter, when the output of the logic circuit 40, for example, is determined and the switches are turned on or off in accordance with an adjustment value, a state where the output voltage VDD of the regulator 10 abruptly changes from a voltage far from the target voltage to a voltage corresponding to the adjustment value. If such a state has occurred, it takes time for the output voltage VDD to become stable under feedback control performed by the operational amplifier OP.

In this regard, as in FIG. 7, the resistors RC3 and RC4 are disposed in series to the first resistor group 21 and the second resistor group 22, respectively, and the resistances of the resistors RC3 and RC4 are set such that when all of the plurality of switches are on or off, the output voltage is a given set voltage. In such a way, even when, at times, such as after power-up, the adjustment signals and the like of the logic circuit 40 have become unstable, the output voltage VDD of the regulator 10 is set to a set voltage close to the target voltage. Accordingly, the occurrence of such a state where the output voltage VDD of the regulator 10 changes from a voltage far from the target voltage to a voltage corresponding to an adjustment value may be inhibited.

In addition, as in FIG. 7, the voltage divider circuit 20 includes a feedback resistance cut-off switch SWC disposed between the first resistor group 21 and the node NS at VSS, which is the predetermined voltage node. As in FIG. 7, the switch SWC is implemented by, for example, an n-type transistor. In detail, electrical connection between the first resistor group 21 and the node NS is cut off by turning off the switch SWC.

Figure 9:
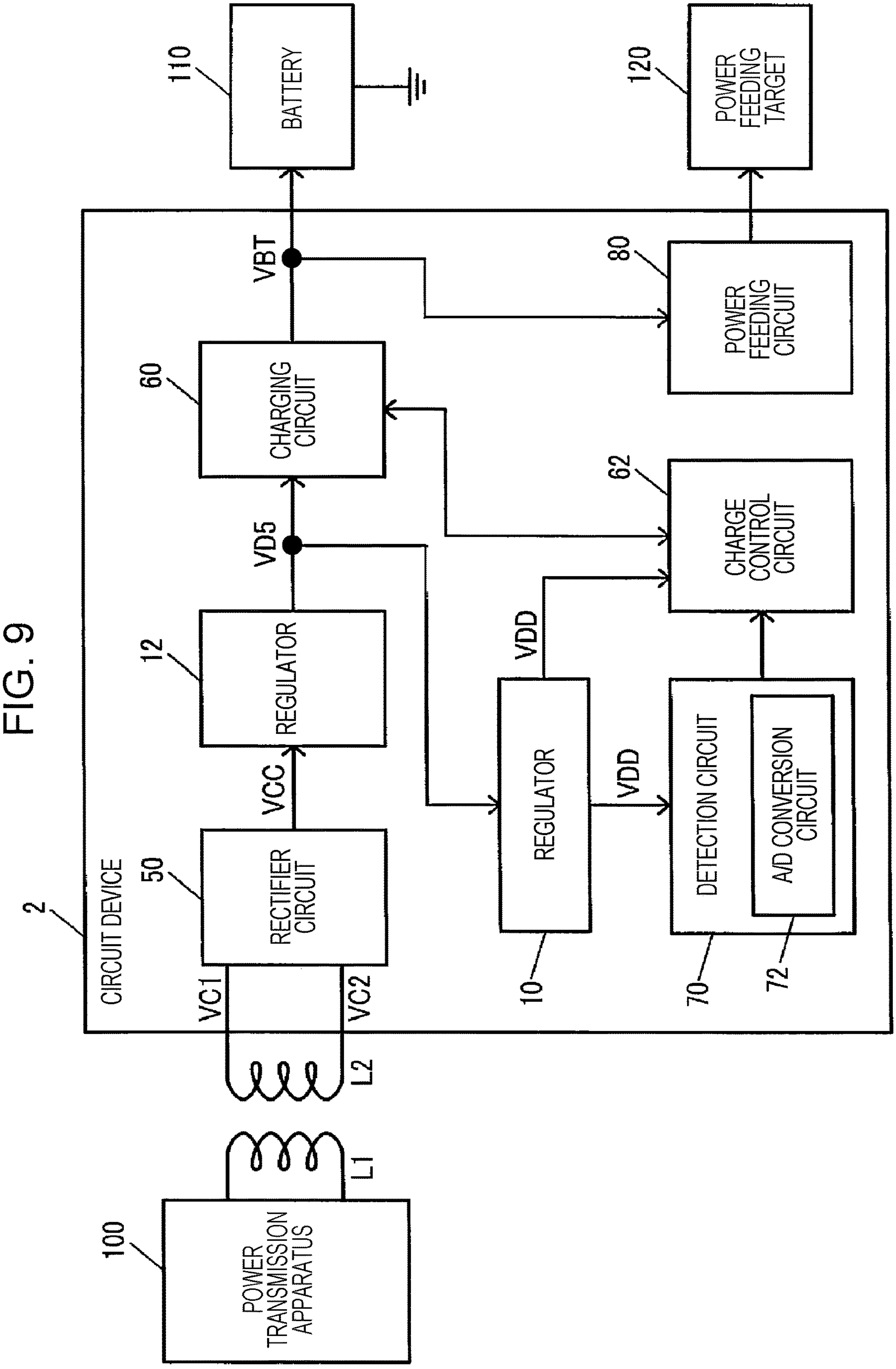
FIG. 9 illustrates an exemplary configuration of a circuit device in the present embodiment.

For example, there are some cases in which, for example, during manufacture of a circuit device illustrated in FIG. 9, a leakage current and so on of a circuit powered by VDD is checked. In this case, VDD is supplied from the outside to the node NVD by an inspection device, such as a tester, for example, via an inspection pad (not illustrated) and the flowing current is measured, so that a leakage current is checked. When VDD is supplied from the outside to the node NVD in such a manner, the current flowing via the feedback resistor of the voltage divider circuit 20 does not allow proper measurement of a leakage current and so on. In this case, as in FIG. 7, the feedback resistance cut-off switch SWC is disposed between the first resistor group 21 and the node NS at VSS. Accordingly, during checking of a leakage current and so on, the switch SWC being turned off enables a current to be inhibited from flowing to VSS via the feedback resistor. This enables proper checking of a leakage current and so on of a circuit powered by VDD.

In addition, a control signal for the feedback resistance cut-off switch SWC is a signal based on the input voltage VD5. For example, as in FIG. 7, the input voltage VD5 is input as a control signal for the switch SWC. However, the control signal for the switch SWC may be any signal based on the input voltage VD5, and is not limited to the input of the input voltage VD5 itself. For example, when, at times, such as after power-up, the feedback resistance cut-off switch SWC is off, the feedback voltage VFB set according to the resistance ratio of feedback resistors of the voltage divider circuit 20 is unstable, and therefore the proper output voltage VDD might be unlikely to be output. For example, as in FIG. 8, by using the resistors RC3 and RC4 in which switches are not disposed in parallel, the output voltage VDD of the regulator 10 is set to a given set voltage even when all of the switches of the voltage divider circuit 20 are on or off. However, at times, such as after power-up, when the feedback resistance cut-off switch SWC is off, such a proper set voltage might be unlikely to be set.

In this regard, as in FIG. 7, the control signal for the feedback resistance cut-off switch SWC is a signal based on the input voltage VD5. Accordingly, at times, such as after power-up, VD5 rises as illustrated in FIG. 3, which enables the feedback resistance cut-off switch SWC to be turned on reliably. This may inhibit the state where the feedback resistance cut-off switch SWC is turned off, the feedback resistance path is blocked, and the output voltage VDD of the regulator 10 results in an inappropriate voltage.

3. Circuit Device

FIG. 9 illustrates an exemplary configuration of the circuit device 2 including the regulator 10 in the present embodiment. FIG. 9 illustrates an exemplary configuration of the circuit device 2, the circuit device 2 is not limited to the configuration in FIG. 9 and may be implemented as various modifications, such as omitting some of the components in the configuration, adding other components, and replacing some of the components with other components.

FIG. 9 illustrates an exemplary application to a contactless power transfer system, and the circuit device 2, which is a power reception control device, performs control for receiving power from a power transmission apparatus 100 in a contactless manner. For example, a primary coil L1 is provided on the side of the power transmission apparatus 100, and a secondary coil L2 is provided on the side of a power receiving device implemented by the circuit device 2. In response to a power transmitting driver of the power transmission apparatus 100 applying an alternating current voltage to the primary coil L1, power is transmitted in a wireless manner from the primary coil L1 to the secondary coil L2, and the power receiving device implemented by the circuit device 2 receives the transmitted power. The circuit device 2 including the regulator 10 in the present embodiment is not limited to that for the purpose of a contactless power transfer system and may be for other purposes.

The circuit device 2 includes a rectifier circuit 50, regulators 10 and 12, a charging circuit 60, and a charge control circuit 62. In addition, the circuit device 2 may include the detection circuit 70 and a power feeding circuit 80. The circuit device 2 is, for example, an integrated circuit (IC) manufactured by a semiconductor process and is a semiconductor chip in which circuit elements are formed in a semiconductor substrate. The circuit elements are active components, such as transistors, and passive components, such as resistors and capacitors.

The rectifier circuit 50 operating as a power reception circuit converts alternating current voltages VC1 and VC2 induced by the secondary coil L2 to a direct current rectified voltage VCC. The regulator 12 regulates the rectified voltage VCC to generate VD5. Thereby, VD5, which is a stable, constant voltage, may be generated from the rectified voltage VCC obtained by rectifying the alternating current voltages VC1 and VC2. The rectifier circuit 50 and the regulator 12 are circuits including, for example, high-voltage (HV) transistors that have a high breakdown voltage. In addition, in the circuit device 2, circuits other than the rectifier circuit 50 and the regulator 12 are circuits including, for example, transistors that have a breakdown voltage lower than HV.

The charging circuit 60 charges the battery 110 based on the input voltage VD5 from the regulator 12. A battery voltage VBT is, for example, the voltage of the positive electrode of the battery 110. For example, the charging circuit 60 includes a charging transistor and a charge control circuit that controls the charging transistor. The charging transistor is, for example, disposed between an input node for the input voltage VD5 and an output node for the battery voltage VBT. In addition, constant current (CC) charging and constant voltage (CV) charging of the battery 110 are performed, for example, by the charge control circuit controlling the gate of the charging transistor. For example, a charging current generated by a charging transistor is detected by a sense resistor, and the charge control circuit controls the gate of the charging transistor based on a detection result, thereby implementing, for example, constant current charging.

The power feeding circuit 80 operates based on the battery voltage VBT to perform feeding operation to a feeding target 120. For example, the power feeding circuit 80 supplies an output voltage generated based on the battery voltage VBT, for example, as a power supply voltage to the feeding target 120. The feeding target 120 is, by way of example, a processing device such as a microcontroller. For example, the power feeding circuit 80 includes a charge pump circuit. The charge pump circuit performs charge pump operation that decreases the battery voltage VBT and supplies an output voltage obtained by decreasing the battery voltage VBT to the feeding target 120. The power feeding circuit 80 may be referred to as a discharge circuit for the battery 110.

In addition, the regulator 10 in the present embodiment regulates the input voltage VD5 and outputs the regulated voltage as the output voltage VDD. The output voltage VDD is supplied as a power supply voltage to the charge control circuit 62 and the detection circuit 70.

The charge control circuit 62 controls the charging circuit 60. For example, the charge control circuit 62 controls the charging circuit 60 based on a detection result of the detection circuit 70. For example, the charge control circuit 62 performs processing for controlling charging by a charging transistor and other components in the charging circuit 60.

The detection circuit 70 performs various types of detection processing in the circuit device 2. For example, by using the detection circuit 70, processing of detecting and monitoring the battery voltage VBT, processing of detecting and monitoring a charging current, temperature detection processing based on a signal from a temperature sensor disposed inside or outside the circuit device 2, and the like may be implemented. For example, the detection circuit 70 performs processing of detecting a voltage, such as the battery voltage VBT, and a current, such as a charging current. The detection circuit 70 includes an analog-to-digital (A/D) conversion circuit 72. The A/D conversion circuit 72 performs A/D conversion to convert a voltage to be detected by the detection circuit 70 to digital detection data. For example, the A/D conversion circuit 72 performs A/D conversion of the battery voltage VBT, A/D conversion of a voltage obtained by converting a charging current, and other operations and outputs digital detection data. The charge control circuit 62 controls the charging circuit 60 based on digital detection data from the detection circuit 70.

In such a manner, the circuit device 2 in the present embodiment includes the regulator 10, the charging circuit 60 that charges charging targets, such as the battery 110, based on the input voltage VD5, and the charge control circuit 62 that controls the charging circuit 60. In addition, the output voltage VDD of the regulator 10 is used as a power supply voltage for the charge control circuit 62 or a power supply voltage for the detection circuit 70 used for the charge control circuit 62. In such a way, the output voltage VDD that is stable and has high voltage accuracy may be supplied as a power supply voltage to the charge control circuit 62 and to the detection circuit 70 that outputs a detection result to the charge control circuit 62. For example, when high accuracy in A/D conversion is intended for the A/D conversion circuit 72 of the detection circuit 70, the output voltage VDD with high voltage accuracy is desired to be supplied as the power supply voltage. In this regard, since the regulator 10 in the present embodiment is provided with the output voltage adjustment circuit 30, the output voltage VDD with high voltage accuracy may be supplied to the A/D conversion circuit 72. In addition, VDD, not VD5, is supplied as a power supply voltage to the output voltage adjustment circuit 30. Accordingly, as described with reference to FIG. 6, even if the adjustment value of the output voltage adjustment circuit 30 changes, the output voltage VDD may be inhibited from becoming unstable, which enables supply of the output voltage VDD that is stable and has high voltage accuracy.

As described above, the regulator in the present embodiment is a regulator for regulating an input voltage to output an output voltage. This regulator includes a voltage divider circuit configured to output, as a feedback voltage, a voltage generated by dividing the output voltage, and an operational amplifier configured to compare the feedback voltage with a reference voltage. In addition, the regulator also includes a drive transistor that is disposed between a node at the input voltage and a node at the output voltage and is configured to be controlled based on an output of the operational amplifier, a logic circuit configured to output an adjustment signal for the output voltage, and an output voltage adjustment circuit configured to adjust the output voltage based on the adjustment signal. In addition, the voltage divider circuit includes a plurality of resistors, and a plurality of switches each of which is disposed in parallel with a corresponding one of the plurality of resistors. The output voltage adjustment circuit is configured to output, to the plurality of switches, a control signal in accordance with the adjustment signal, and the output voltage is supplied as a power supply voltage to the output voltage adjustment circuit.

According to the present embodiment, a feedback voltage generated by dividing an output voltage by a voltage divider circuit and a reference voltage are compared by an operational amplifier, and a drive transistor is controlled based on an output of the operational amplifier, and an output voltage is output. Then, the logic circuit outputs an adjustment signal for the output voltage, and the output voltage adjustment circuit adjusts the output voltage based on the adjustment signal. In addition, the voltage divider circuit includes a plurality of resistors and a plurality of switches, and an output voltage is supplied as a power supply voltage to the output voltage adjustment circuit that outputs a control signal in accordance with the adjustment signal to the plurality of switches. Such a way enables output of an output voltage with high voltage accuracy by the output voltage adjustment circuit adjusting an output voltage based on an adjustment signal from the logic circuit. In addition, since the output voltage adjustment circuit outputs a control signal using an output voltage, not an input voltage, as a power supply voltage. Therefore, even if changes in the control signals cause the feedback voltage to fluctuate, resulting in the occurrence of fluctuations in the input voltage, the fluctuations in the input voltage are inhibited from being transmitted as fluctuations in the power supply voltage to the output voltage adjustment circuit. Accordingly, it is enabled to output an output voltage with high voltage accuracy while inhibiting the occurrence of such a state where the output of a regulator is not stable.

In addition, in the present embodiment, each switch of the plurality of switches may include an n-type transistor and a p-type transistor coupled in parallel. In addition, the output voltage adjustment circuit may include a first inverter configured to output a first control signal for controlling one of the n-type transistor and the p-type transistor, and a second inverter configured to receive an output of the first inverter and to output a second control signal for controlling the other of the n-type transistor and the p-type transistor.

Such a manner may decrease the on-resistance upon turn-on of a switch and enable the switch to be properly turned on by using a control signal from the output voltage adjustment circuit.

In addition, in the present embodiment, the logic circuit may include an initial value register and be configured to, after a power-on reset, output the adjustment signal based on the initial value of an adjustment value for the output voltage from the initial value register.

Such a way enables the turn-on or turn-off of the switches to be properly controlled after a power-on reset to set the output voltage to a voltage corresponding to the initial value of an adjustment value.

In addition, in the present embodiment, the logic circuit may output an adjustment signal based on the adjustment value for the output voltage read out from a nonvolatile memory.

Such a way enables the turn-on or turn-off of the switches to be controlled properly based on an adjustment value stored in the nonvolatile memory to set the output voltage to a voltage corresponding to the adjustment value.

In addition, in the present embodiment, the output voltage may be supplied as a power supply voltage in common to the output voltage adjustment circuit and the logic circuit.

Such a way enables an adjustment signal to be generated by causing the logic circuit to operate based on the output voltage generated by the regulator, so that the adjustment signal is input to the output voltage adjustment circuit that operates using the output voltage as the power supply voltage.

In addition, in the present embodiment, the plurality of resistors may include a first resistor group disposed between a feedback voltage node from which the feedback voltage is output and a predetermined voltage node, and a second resistor group disposed between the node at the output voltage and the feedback voltage node.

In such a manner, the output voltage may be set to a voltage in accordance with an adjustment value by controlling the turn-on or turn-off of each switch disposed in parallel with a corresponding resistor of the first resistor group and each switch disposed in parallel with a corresponding resistor of the second resistor group.

In addition, in the present embodiment, the logic circuit may be configured to output the adjustment signal such that when a first switch disposed in parallel with a first resistor of the first resistor group is in one of an on state and an off state, a second switch disposed in parallel with a second resistor of the second resistor group is in the other of the on state and the off state.

Such a way enables implementation of such switch control not to change the total resistance of feedback resistors composed of the first resistor group and the second resistor group.

In addition, in the present embodiment, the first resistor and the second resistor may be registers having the same resistance.

In such a way, when a switch of one resistor group is turned on and the resistance of the one resistor group decreases, the switch of the other resistor group is turned off and the resistance of the other resistor group increases, which results in no change in the total resistance.

In addition, in the present embodiment, the voltage divider circuit may further include a third resistor disposed in series to the first resistor group, and a fourth resistor disposed in series to the second resistor group. The resistances of the third resistor and the fourth resistor may be set such that when all of the plurality of switches are on or off, the output voltage is a given set voltage.

In such a way, even when the adjustment signals and the like of the logic circuit have become unstable, the output voltage of the regulator is set to a set voltage close to the target voltage.

In addition, in the present embodiment, the voltage divider circuit may further include a feedback resistance cut-off switch disposed between the first resistor group and the predetermined voltage node.

In such a way, during checking of a leakage current and so on of a circuit to which an output voltage is supplied, the turn-off of the feedback resistance cut-off switch enables a current to be inhibited from flowing via the feedback resistor.

In addition, in the present embodiment, a control signal for the feedback resistance cut-off switch may be a signal based on the input voltage.

In such a way, the input voltage rising at times, such as after power-up, enables the feedback resistance cut-off switch to be turned on reliably.

In addition, a circuit device in the present embodiment includes the regulator described above, a charging circuit configured to, based on the input voltage, charge an object to be charged, and a charge control circuit configured to control the charging circuit. The output voltage is supplied as a power supply voltage for the charge control circuit or a power supply voltage for a detection circuit used for the charge control circuit.

In such a way, the output voltage that is stable and has high voltage accuracy may be supplied as a power supply voltage to the charge control circuit and to the detection circuit.

Although the present embodiment has been described above in details, the person skilled in the art would readily understand that many modifications may be made without substantially departing from new matters and effects of the present disclosure. Accordingly, all of such modifications are considered to fall within the scope of the present disclosure. For example, in the specification or the figures, the terms used at least once together with different broader or synonymous terms may be replaced with the different terms in any part of the specification or the figures. In addition, all combinations of the present embodiment and modifications are included in the scope of the present disclosure. In addition, the configurations, operations, and so on of the regulator and the circuit device are not limited to those described in the present embodiment, and various modifications may be carried out.

What is claimed is:

1. A regulator for regulating an input voltage to output an output voltage, the regulator comprising:

a voltage divider circuit configured to output, as a feedback voltage, a voltage generated by dividing the output voltage;

an operational amplifier configured to compare the feedback voltage with a reference voltage;

a drive transistor being disposed between a node at the input voltage and a node at the output voltage and configured to be controlled based on an output of the operational amplifier;

a logic circuit configured to output a plurality of adjustment signals for the output voltage; and an output voltage adjustment circuit configured to adjust the output voltage based on the plurality of adjustment signals, wherein the voltage divider circuit includes:

a plurality of resistors; and a plurality of switches, each switch of the plurality of switches being disposed in parallel with a corresponding resistor of the plurality of resistors, the output voltage adjustment circuit is configured to output, to the plurality of switches, a plurality of control signals in accordance with the plurality of adjustment signals, the output voltage is supplied as a power supply voltage to the output voltage adjustment circuit, and a number of the plurality of adjustment signals is the same as each of a number of the plurality of control signals and a number of the plurality of switches.

2. The regulator according to claim 1, wherein the each switch of the plurality of switches includes an n-type transistor and a p-type transistor coupled in parallel, and the output voltage adjustment circuit includes:

a first inverter configured to output a first control signal for controlling one of the n-type transistor and the p-type transistor; and a second inverter configured to receive an output of the first inverter and to output a second control signal for controlling another of the n-type transistor and the p-type transistor.

3. The regulator according to claim 1, wherein the logic circuit:

includes an initial value register; and is configured to, after a power-on reset, output the plurality of adjustment signals based on an initial value of an adjustment value for the output voltage from the initial value register.

4. The regulator according to claim 1, wherein the logic circuit is configured to output the plurality of adjustment signals based on an adjustment value for the output voltage read out from a nonvolatile memory.

5. The regulator according to claim 1, wherein the output voltage is supplied as a power supply voltage in common to the output voltage adjustment circuit and the logic circuit.

6. The regulator according to claim 1, wherein the plurality of resistors include;

a first resistor group disposed between a feedback voltage node from which the feedback voltage is output and a predetermined voltage node; and a second resistor group disposed between the node at the output voltage and the feedback voltage node.

7. The regulator according to claim 6, wherein the logic circuit is configured to output the plurality of adjustment signals such that when a first switch disposed in parallel with a first resistor of the first resistor group is in one of an on state and an off state, a second switch disposed in parallel with a second resistor of the second resistor group is in another of the on state and the off state.

8. The regulator according to claim 7, wherein the first resistor and the second resistor are registers having the same resistance.

9. The regulator according to claim 6, wherein the voltage divider circuit further includes:

a third resistor disposed in series to the first resistor group; and a fourth resistor disposed in series to the second resistor group, and resistances of the third resistor and the fourth resistor are set such that when all of the plurality of switches are on or off, the output voltage is a given set voltage.

10. The regulator according to claim 6, wherein the voltage divider circuit further includes a feedback resistance cut-off switch disposed between the first resistor group and the predetermined voltage node.

11. The regulator according to claim 10, wherein a control signal for the feedback resistance cut-off switch is a signal based on the input voltage.

12. A circuit device comprising:

the regulator according to claim 1;

a charging circuit configured to, based on the input voltage, charge an object to be charged; and a charge control circuit configured to control the charging circuit, wherein the output voltage is supplied as a power supply voltage for the charge control circuit or a power supply voltage for a detection circuit used for the charge control circuit.

13. A regulator for regulating an input voltage to output an output voltage, the regulator comprising:

a voltage divider circuit configured to output, as a feedback voltage, a voltage generated by dividing the output voltage;

an operational amplifier configured to compare the feedback voltage with a reference voltage;

a drive transistor being disposed between a node at the input voltage and a node at the output voltage and configured to be controlled based on an output of the operational amplifier;

a logic circuit configured to output an adjustment signal for the output voltage; and an output voltage adjustment circuit configured to adjust the output voltage based on the adjustment signal, wherein the voltage divider circuit includes:

a plurality of resistors; and a plurality of switches, each switch of the plurality of switches being disposed in parallel with a corresponding resistor of the plurality of resistors, the output voltage adjustment circuit is configured to output, to the plurality of switches, a control signal in accordance with the adjustment signal, the output voltage is supplied as a power supply voltage to the output voltage adjustment circuit, the each switch of the plurality of switches includes an n-type transistor and a p-type transistor coupled in parallel, and the output voltage adjustment circuit includes:

a first inverter configured to output a first control signal for controlling one of the n-type transistor and the p-type transistor; and a second inverter configured to receive an output of the first inverter and to output a second control signal for controlling another of the n-type transistor and the p-type transistor.

14. A regulator for regulating an input voltage to output an output voltage, the regulator comprising:

a voltage divider circuit configured to output, as a feedback voltage, a voltage generated by dividing the output voltage;

an operational amplifier configured to compare the feedback voltage with a reference voltage;

a drive transistor being disposed between a node at the input voltage and a node at the output voltage and configured to be controlled based on an output of the operational amplifier;

a logic circuit configured to output an adjustment signal for the output voltage; and an output voltage adjustment circuit configured to adjust the output voltage based on the adjustment signal, wherein the voltage divider circuit includes:

a plurality of resistors; and a plurality of switches, each switch of the plurality of switches being disposed in parallel with a corresponding resistor of the plurality of resistors, the output voltage adjustment circuit is configured to output, to the plurality of switches, a control signal in accordance with the adjustment signal, the output voltage is supplied as a power supply voltage to the output voltage adjustment circuit, and the plurality of resistors include:

a first resistor group disposed between a feedback voltage node from which the feedback voltage is output and a predetermined voltage node; and a second resistor group disposed between the node at the output voltage and the feedback voltage node.

15. The regulator according to claim 14, wherein the logic circuit is configured to output the adjustment signal such that when a first switch disposed in parallel with a first resistor of the first resistor group is in one of an on state and an off state, a second switch disposed in parallel with a second resistor of the second resistor group is in another of the on state and the off state.

16. The regulator according to claim 15, wherein the first resistor and the second resistor are registers having the same resistance.

17. The regulator according to claim 14, wherein the voltage divider circuit further includes:

a third resistor disposed in series to the first resistor group; and a fourth resistor disposed in series to the second resistor group, and resistances of the third resistor and the fourth resistor are set such that when all of the plurality of switches are on or off, the output voltage is a given set voltage.

18. The regulator according to claim 14, wherein the voltage divider circuit further includes a feedback resistance cut-off switch disposed between the first resistor group and the predetermined voltage node.

19. The regulator according to claim 18, wherein a control signal for the feedback resistance cut-off switch is a signal based on the input voltage.

* * * * *